United States Patent
Kozu

(10) Patent No.: US 8,206,876 B2
(45) Date of Patent: Jun. 26, 2012

(54) FUEL CARTRIDGE FOR A FUEL CELL HAVING A FLEXIBLE OUTER CASING

(75) Inventor: Katsumi Kozu, Hyogo (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 11/709,298

(22) Filed: Feb. 22, 2007

(65) Prior Publication Data

US 2007/0231622 A1    Oct. 4, 2007

(30) Foreign Application Priority Data

Feb. 22, 2006    (JP) .................................. 2006-045506

(51) Int. Cl.
 *H01M 8/04*    (2006.01)

(52) U.S. Cl. ........................................ 429/515; 429/444

(58) Field of Classification Search .................... 429/34, 429/35, 36, 37, 38, 39; 220/723
See application file for complete search history.

(56) References Cited

U.S. PATENT DOCUMENTS

| | | | |
|---|---|---|---|
| 2003/0082427 A1* | 5/2003 | Prasad et al. | 429/34 |
| 2005/0023236 A1* | 2/2005 | Adams et al. | 215/3 |
| 2005/0098568 A1* | 5/2005 | Tsai | 220/723 |
| 2005/0260481 A1* | 11/2005 | Finkelshtain et al. | 429/34 |

FOREIGN PATENT DOCUMENTS

| | | |
|---|---|---|
| JP | 56-103482 | 1/1955 |
| JP | 2003-276719 | 10/2003 |
| JP | 2003-308871 A | 10/2003 |
| WO | WO 03/061047 A1 | 7/2003 |

\* cited by examiner

*Primary Examiner* — Barbara Gilliam
*Assistant Examiner* — Stephan Essex
(74) *Attorney, Agent, or Firm* — McDermott Will & Emery LLP

(57) ABSTRACT

A fuel cartridge for fuel cells is configured to include an inner bag made of a flexible material and filled with liquid fuel, a valve provided to the inner bag for discharging the fuel, and an outer case encasing the inner bag with the valve being exposed to the outside, the outer case being deformable by a hand and able to recover its initial shape by itself. The fuel cartridge allows the liquid fuel inside to be used almost completely irrespective of its attachment direction, and can be used in both applications where the cartridge is hand-pressed to discharge fuel and where fuel is pumped-out from the cartridge.

5 Claims, 4 Drawing Sheets

FUEL CARTRIDGE FOR A FUEL CELL HAVING A FLEXIBLE OUTER CASING

The present disclosure relates to subject matter contained in priority Japanese Patent Application No. 2006-45506 filed on Feb. 22, 2006, the contents of which is herein expressly incorporated by reference in its entirety.

BACKGROUND OF THE INVENTION

1. Field of the Invention

The present invention relates to fuel cartridges for fuel cells, and fuel cell systems that use fuel cartridges.

2. Description of the Related Art

Conventional fuel cell units include a fuel cell and a reserve tank, and fuel cartridges are used for supplying fuel to the fuel cell that produces electrical energy from liquid fuel. One type of known fuel cartridge is designed to replenish the reserve tank in the fuel cell unit with fuel. The fuel cartridge usually contains the liquid fuel directly in a case that is deformable when pressed by a human hand, with a valve section at one end to discharge the fuel. When replenishing the reserve tank in the fuel cell unit with fuel, the fuel cartridge is set upright so that its valve section is positioned lower than the fuel liquid surface, and is pressed by a human hand to pour out the liquid fuel. After that, the pressure on the case is released so as to cause a backflow of outside air from the fuel cell unit side while the case recovers its initial shape.

Another type of fuel cartridge, which is used as attached in the fuel cell unit, includes an inner bag or its counterpart inside a high-rigidity outer case of the cartridge, the liquid fuel being contained inside the inner bag or its counterpart, so that the liquid fuel can be taken out irrespective of the attachment direction of the fuel cartridge (see, for example, Japanese Patent Laid-Open Publication No. 2003-308871).

The problem with fuel cartridges that directly contain the liquid fuel in the case is that part of the fuel, i.e., the volume below the liquid surface that is positioned lower than the valve, cannot be taken out. Thus, with the fuel cell unit that uses a fuel cartridge directly containing liquid fuel, there are limitations on the direction of attachment of the fuel cartridge so that the fuel is poured out almost entirely into the reserve tank by pressing the case with a human hand. The fuel replenishment efficiency and cartridge usability are therefore poor and, very often, the fuel inside the case cannot be used completely.

In a design in which the fuel cartridge is set inside the fuel cell unit and fuel is sucked out using a pump provided in the fuel cell unit, the same problem applies, i.e., part of the fuel, the volume below the valve cannot be taken out.

With the fuel cartridge that contains liquid fuel in the inner bag inside the rigid outer case, it is not possible to inject fuel into the reserve tank of the fuel cell unit with a human hand. Furthermore, the usability is poor because this fuel cartridge cannot be conveniently used in both applications where the cartridge is set inside the fuel cell unit and where the fuel is injected from the cartridge into the reserve tank of the fuel cell unit by a human hand.

SUMMARY OF THE INVENTION

In light of the problems encountered by the conventional techniques, it is an object of the present invention to provide a fuel cartridge for fuel cells and a fuel cell system that uses the fuel cartridge, the fuel cartridge allowing almost all of the liquid fuel inside to be used up irrespective of the attachment direction, and that can be used in both applications where the fuel is injected by pressure applied by a human hand and where the fuel is sucked out with a pump.

The fuel cartridge for fuel cells according to the present invention includes an inner bag made of a flexible material and filled with liquid fuel, a valve provided to the inner bag for discharging the fuel, and an outer case encasing the inner bag with the valve being exposed to the outside, the outer case being deformable by a hand and able to recover its initial shape by itself.

With this design, because the flexible inner bag containing liquid fuel is encased in the outer case that is deformable by a hand and able to recover its initial shape by itself, when the outer case is pressed and deformed, the inner bag is pressed directly with the outer case, or through air pressure that is raised by the deformation of the outer case, so that the liquid fuel is discharged from the valve. As the internal volume of the inner bag reduces at the same time with the decrease in the liquid fuel, no air pockets are formed inside the inner bag, and therefore the liquid fuel inside the inner bag can be almost completely taken out irrespective of the direction of the fuel cartridge or the position of the valve. Furthermore, this fuel cartridge can be used in both applications where the outer case is pressed by a human hand to inject liquid fuel and where the liquid fuel is sucked out from the valve using a pump.

With a passive valve being provided to the outer case so as to take in outside air when the outer case recovers its initial shape, the cartridge will be easy to use because it is only necessary to press the outer case repeatedly as required to discharge the liquid fuel, this being achieved by the passive valve, which shuts up the outer case after air is sucked in automatically in the amount that equals to that of discharged liquid fuel while the case recovers its initial shape.

Alternatively, the outer case may be provided with an opening to let in outside air when the outer case recovers its initial shape, in which case, too, the liquid fuel is discharged with ease by shutting the opening with a finger or the like when pressing the outer case to inject the fuel. Moreover, without the passive valve described above, the cost is reduced with this design.

The fuel cell system according to the present invention includes the above-described fuel cartridge for fuel cells, and a fuel cell that produces electrical energy from liquid fuel supplied from the fuel cartridge, and offers the advantages achieved by the use of the above-described fuel cartridges.

With the fuel cartridge for fuel cells of the present invention, the liquid fuel inside the inner bag is discharged from the valve by pressing and deforming the outer case, and since no air pockets are formed inside the inner bag, the liquid fuel inside the inner bag can be almost completely taken out irrespective of the direction of the fuel cartridge or the position of the valve. Furthermore, this fuel cartridge can be used in both applications where the outer case is pressed by a human hand to inject liquid fuel and where the liquid fuel is sucked out from the valve with a pump.

The above and other objects and features of the present invention will become apparent from the following description of preferred embodiments given in conjunction with the accompanying drawings.

DETAILED DESCRIPTION OF THE PREFERRED EMBODIMENTS

One preferred embodiment of the fuel cartridge for fuel cells and the fuel cell system of the present invention will now be described with reference to FIG. 1A to FIG. 4.

Figure 4:
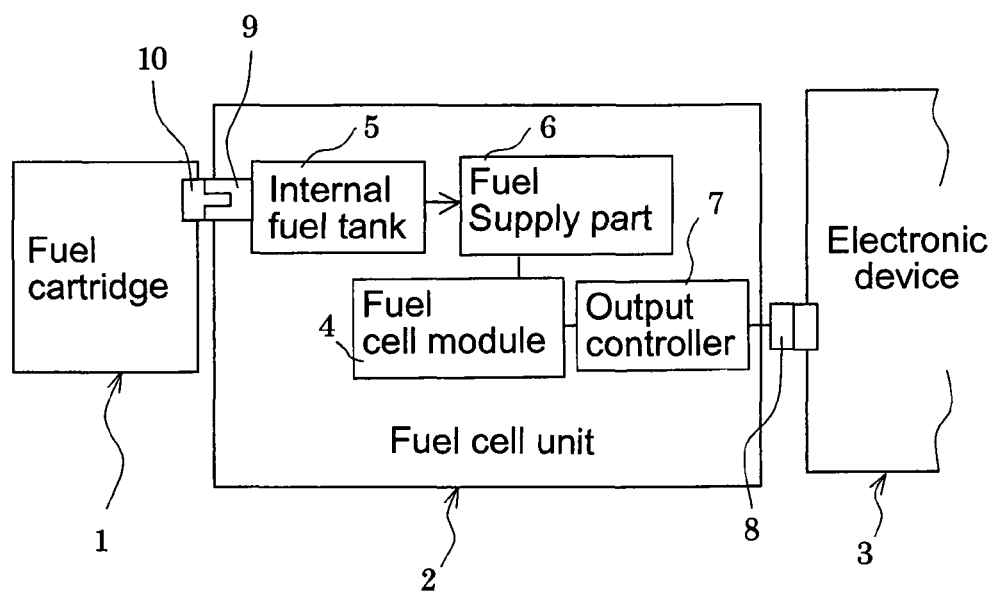
FIG. 4 is a schematic overall view of the fuel cell system that uses the fuel cartridge according to the embodiment.

This embodiment of the fuel cartridge for fuel cells (hereinafter simply fuel cartridge) 1 is used for supplying fuel to a fuel cell unit 2 that supplies power to an electronic device 3 of various types as shown in FIG. 4. The illustrated example of the fuel cell unit 2 includes a fuel cell module 4, which produces electrical energy from supplies of fuel such as methanol (on the anode side) and oxygen (on the cathode side) with a solid polymer electrolyte interposed between the anode and the cathode, a fuel supply part 6 that supplies fuel from an internal fuel tank 5 to the fuel cell module 4, an output controller 7 for controlling output of electrical energy produced by the fuel cell module 4, and a connector 8 for connecting the fuel cell unit 2 with the electronic device 3.

A female valve 9 is provided to the inlet of the internal fuel tank 5, to which a male valve 10 on the fuel cartridge 1 is inserted and coupled so as to communicate the tank 5 with the cartridge 1 and to replenish the tank 5 with the methanol fuel from the cartridge 1.

Figure 1A:
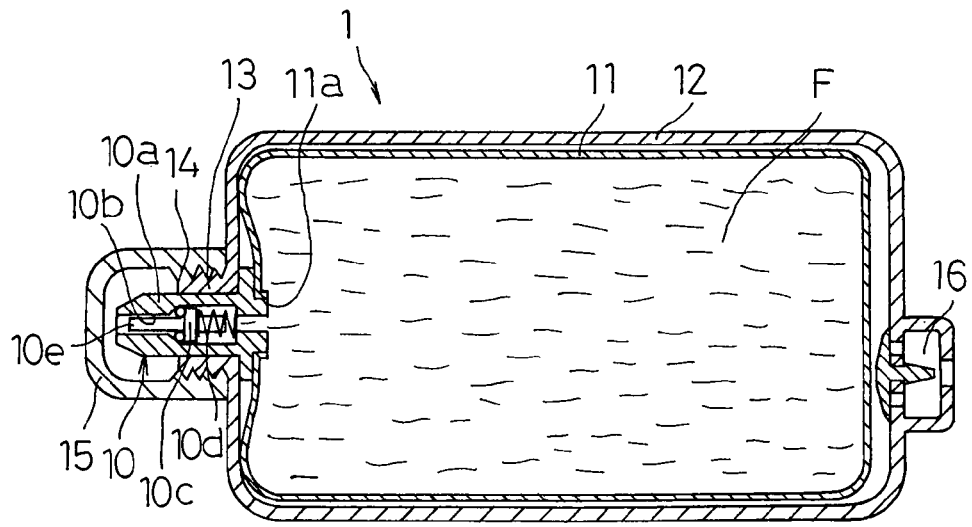
FIG. 1A is a longitudinal cross-sectional front view of one embodiment of the fuel cartridge of the present invention and FIG. 1B and FIG. 1C are schematic diagrams of the outer case of the fuel cartridge, FIG. 1B showing the state when pressure is applied and FIG. 1C showing the state when the pressure is released.
Figure 1B:
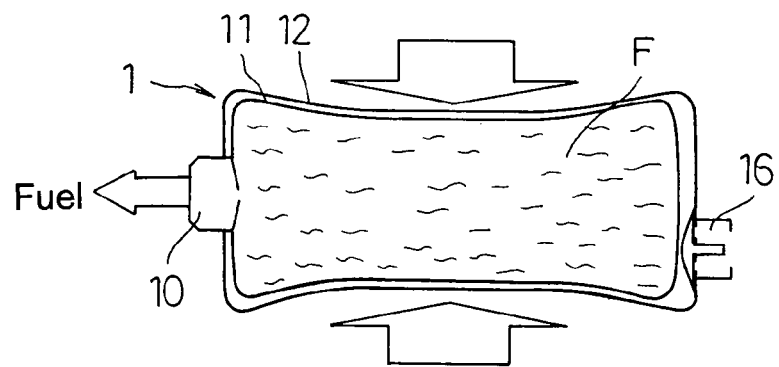
Figure 1C:
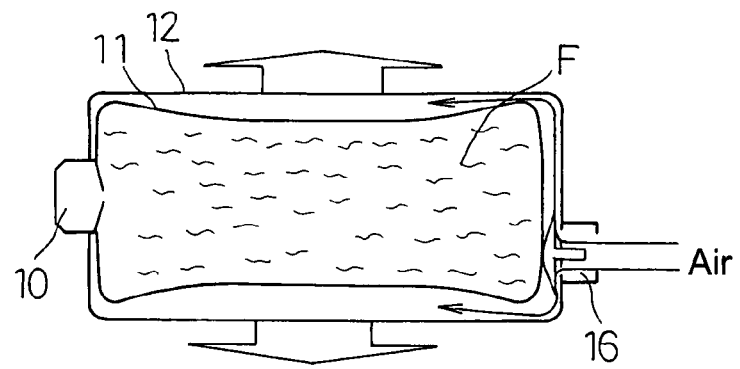

As shown in FIG. 1A to FIG. 1C, the fuel cartridge 1 includes an inner bag 11 made of a flexible material and filled with methanol fuel F, with the valve 10 provided at the outlet 11a at one end, and an outer case 12 that encases the inner bag 11 and that is deformable by a hand and able to recover its initial shape by itself. Nylon can be used as the material for the inner bag 11, but polyethylene or polypropylene is preferable in terms of flexibility and fuel barrier properties. Polyethylene or polypropylene is also preferable for the material of the outer case 12 in terms of flexibility, recoverability, and fuel resistance.

The valve 10 is closed with a valving element 10c disposed in the passageway 10b formed along the axial center of the valve body 10a. A stem 10e extends from the valving element 10c to the vicinity of the open end of the passageway 10b. To open the valve, the stem 10e is pushed in against the force of a spring 10d that presses the valving element 10c towards the valve-closing position. The base end of the valve body 10a is securely attached to the outer circumference of the outlet 11a of the inner bag 11.

The outer case 12 has a shape and size designed to snugly encase the inner bag 11. A holding tube 13 is provided at one end in the center, which holds the base end half of the valve body 10a inserted therein, with the distal end of the valve body 10a protruding outside. To ensure safety in case where a small child or the like puts the valve 10 into its mouth, a thread 14 is formed on the outer circumference of the holding tube 13, with which a cap 15 is engaged so that the valve 10 is not directly exposed to the outside.

At the other end of the outer case 12 is provided a passive valve 16, which is normally shut and opened only to let outside air flow into the outer case 12. It stays shut when the outer case 12 is pressed and deformed so that the air pressure inside the case rises, while allowing outside air to flow into the outer case 12 smoothly when pressure is released and the case recovers its initial shape.

Instead of the passive valve 16, a simple opening (not shown) may be provided, in which case the opening is shut with a finger while the outer case 12 is pressed and deformed, and is opened to let in outside air when the case recovers its initial shape.

When replenishing the internal fuel tank 5 of the fuel cell unit 2 with methanol fuel F from the fuel cartridge 1, the valve 10 is inserted into the valve 9 to connect the fuel cartridge 1 with the fuel cell unit 2, as shown in FIG. 4. The valves 9 and 10 are thereby opened so that the fuel cartridge 1 communicates with the internal fuel tank 5, and in this state, the outer case 12 of the fuel cartridge 1 is compressed by a hand.

Since the fuel cartridge 1 includes the outer case 12 that can be deformed by a hand and recovers its shape by itself, with the flexible inner bag 11 containing the methanol fuel F encased in the outer case 12, when the outer case 12 is pressed and deformed, the inner bag 11 is directly pressed with the outer case 12, whereby the methanol fuel F is discharged from the valve 10, as shown in FIG. 1B. After discharging a predetermined amount of methanol fuel F, pressure on the outer case 12 is released, the outer case 12 recovers its shape by itself as shown in FIG. 1C, and at the same time the passive valve 16 opens to let outside air flow smoothly into the outer case 12 to help the case recover its shape easily and completely. Since the internal volume of the inner bag 11 reduces at the same time with the decrease in the methanol fuel F inside the bag 11, no air pockets are formed inside the inner bag 11. The passive valve 16 shuts when the space between the outer case 12 and the inner bag 11 with the decreased internal volume is filled with outside air.

To discharge methanol fuel F further from the fuel cartridge 1, the operation of pressing and deforming the outer case 12 is repeated. When pressure is applied to the air inside the outer case 12, the raised air pressure presses the inner bag 11, letting out the methanol fuel F from the valve 10. After finishing the replenishment of the internal fuel tank 5 with the methanol fuel F, the valve 10 is pulled out a little from the valve 9, whereby both valves 9 and 10 are shut, and the fuel cartridge 1 can be taken out from the fuel cell unit 2.

Figure 2A:
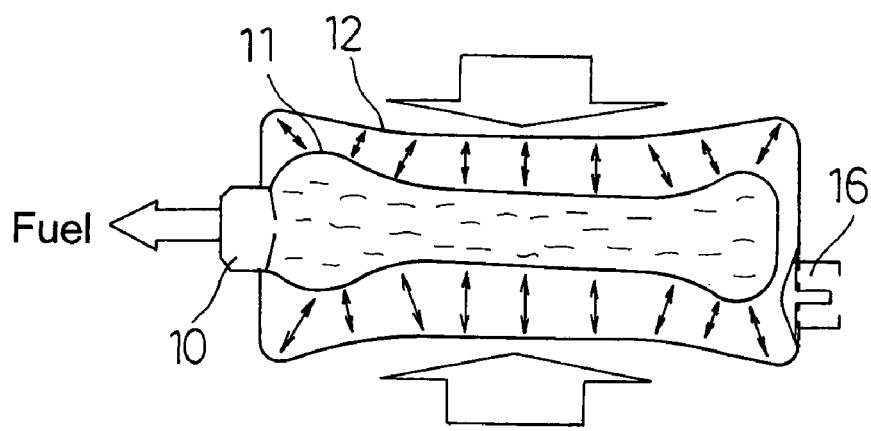
FIG. 2A and FIG. 2B are schematic diagrams illustrating the outer case of the fuel cartridge with its content half consumed, FIG. 2A showing the state when pressure is applied and FIG. 2B showing the state when the pressure is released.
Figure 2B:
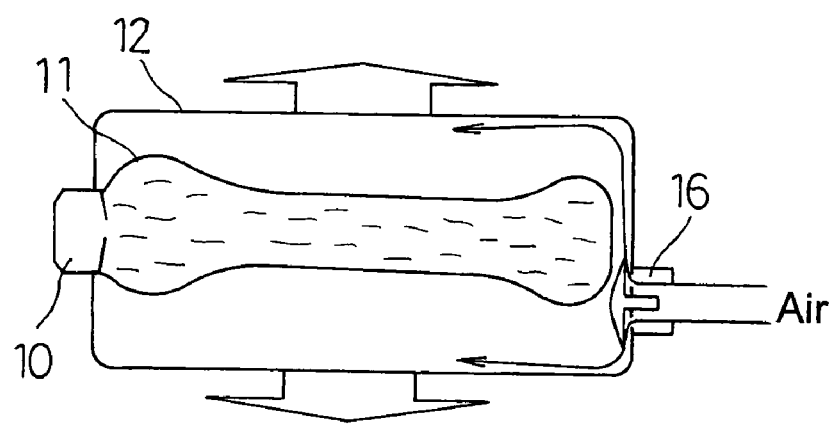

When replenishing the internal fuel tank 5 of the fuel cell unit 2 with methanol fuel F again, the valve 10 is inserted into the valve 9 to connect the fuel cartridge 1 with the fuel cell unit 2 and the outer case 12 is pressed and deformed as described in the foregoing, so that the air inside the outer case 12 is compressed and the raised air pressure presses the inner bag 11, discharging the methanol fuel F from the valve 10 as shown in FIG. 2A. After that, when pressure on the outer case 12 is released, the case recovers its initial shape by itself and the passive valve 16 opens to let outside air flow into the outer case 12 smoothly, helping the case recover its shape easily, as shown in FIG. 2B.

Figure 3A:
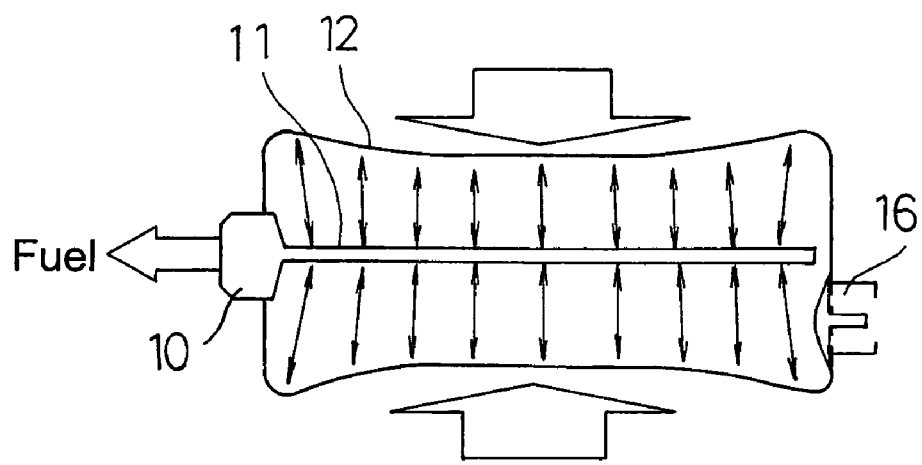
FIG. 3A and FIG. 3B are schematic diagrams illustrating the outer case of the fuel cartridge in its final state, FIG. 3A showing the state when pressure is applied and FIG. 3B showing the state when the pressure is released.
Figure 3B:
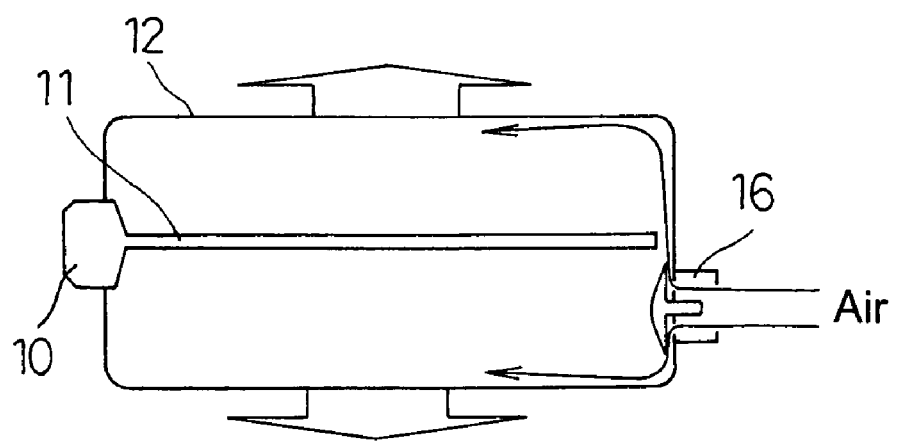

By pressing the outer case 12 of the fuel cartridge 1 repeatedly, the methanol fuel F inside the inner bag 11 is discharged each time. As described above, the internal volume of the inner bag 11 decreases at the same time with the decrease in the methanol fuel F, and no air pockets are created inside the inner bag 11. Therefore, the methanol fuel F inside the inner bag 11 can be discharged irrespective of the direction of the fuel cartridge 1 or the position of the valve 10, and can be used almost completely as shown in FIG. 3A and FIG. 3B.

The embodiment described above is one example in which the fuel cartridge 1 is connected to the fuel cell unit 2 to replenish the unit with fuel, with the outer case 12 of the fuel cartridge 1 being pressed by a human hand to inject the methanol fuel F into the internal fuel tank 5. It should be noted here that this fuel cartridge 1 can also be used in a design wherein the fuel cartridge 1 is accommodated inside the fuel cell unit 2, and after opening the valve 10, the methanol fuel F inside the inner bag 11 is sucked out through the valve 10 using a pump inside the fuel cell unit 2.

Another advantage of the embodiment described above is that it is easy to use because it is only necessary to press the outer case 12 every time the methanol fuel F needs to be replenished, this being achieved by the passive valve 16 provided to the outer case 12, which shuts up the case 12 after air is sucked in automatically in the amount that equals to that of discharged methanol fuel F while the case 12 recovers its initial shape. Instead, the outer case 12 may be provided with a simple opening (not shown) to let in outside air, in which case, too, the methanol fuel F can be discharged with ease by shutting the opening with a finger or the like when pressing the outer case 12 to inject the fuel. The cost is reduced with this design.

With the fuel cartridge for fuel cells of the present invention, the liquid fuel inside the inner bag is discharged from the valve by pressing and deforming the outer case, and since no air pockets are formed inside the inner bag, the liquid fuel can be used almost completely irrespective of the direction of the fuel cartridge or the position of the valve. Also, this fuel cartridge can be used in both applications where the liquid fuel is injected by pressing the outer case with a human hand and where the liquid fuel is sucked out from the valve using a pump, and therefore is applicable to fuel cell systems of various portable electronic devices such as mobile phones and notebook PCs.

While preferred embodiments of the invention have been described using specific terms, such description is for illustrative purposes only, and it is to be understood that changes and variations may be made without departing from the spirit or scope of the following claims.

What is claimed is:

1. A fuel cartridge for a fuel cell, comprising:
   an inner bag made of a flexible material and filled with liquid fuel;
   a valve provided to the inner bag for discharging the fuel;
   an outer case encasing the inner bag with the valve being exposed to the outside, the outer case being deformable by hand so that the liquid fuel is discharged from the cartridge and able to recover to its initial shape by itself;
   a holding tube provided in the outer case, holding a base end half of the valve so that a distal end of the valve protrudes outside, and having a thread formed on an outer circumference of the holding tube; and
   a cap engaged with the thread and covering the valve so that the valve is not directly exposed to the outside, wherein
   the outer case and inner bag have shapes and sizes such that, when the outer case is deformed by the hand, pressure applied by the hand to the outer case is also applied to the inner bag,
   the outer case is an outermost case of the fuel cartridge,
   a flange section is provided to the base end of the valve, and
   the flange section is in contact with an inner circumference of an outlet of the outer case, and is connected to an outer circumference of an outlet of the inner bag.

2. The fuel cartridge for a fuel cell according to claim 1, further comprising a passive valve being provided to the outer case so as to take in outside air when the outer case recovers to its initial shape.

3. The fuel cartridge for a fuel cell according to claim 1, wherein the outer case is provided with an opening to let in outside air when the outer case recovers to its initial shape.

4. A fuel cell system comprising:
   the fuel cartridge for a fuel cell according to claim 1; and
   a fuel cell that produces electrical energy from liquid fuel supplied from the fuel cartridge.

5. The fuel cartridge for a fuel cell according to claim 1, wherein the outer case being comprises at least one of polyethylene or polypropylene.

* * * * *